United States Patent [19]

Inoue et al.

[11] Patent Number: 4,700,116

[45] Date of Patent: Oct. 13, 1987

[54] SYSTEM FOR CONTROLLING BRUSHLESS DC MOTOR

[75] Inventors: Tooru Inoue; Kiyoshi Nagasawa; Kyooji Yamane, all of Tochigi, Japan

[73] Assignee: Hitachi, Ltd., Tokyo, Japan

[21] Appl. No.: 830,715

[22] Filed: Feb. 19, 1986

[30] Foreign Application Priority Data

Mar. 29, 1985 [JP] Japan ................................. 60-63588

[51] Int. Cl.⁴ .............................................. H02P 6/02
[52] U.S. Cl. .................................... 318/254; 318/138; 318/430
[58] Field of Search ............... 318/138, 254, 301, 309, 318/310, 311, 317, 430, 431, 439, 277

[56] References Cited

U.S. PATENT DOCUMENTS

| 4,097,788 | 6/1978 | Nygaard et al. | 318/138 X |
| 4,403,177 | 9/1983 | Weber et al. | 318/254 |
| 4,454,458 | 6/1984 | Holland | 318/254 |
| 4,510,422 | 4/1985 | Ogura | 318/254 |
| 4,544,868 | 10/1985 | Murty | 318/138 X |
| 4,583,028 | 4/1986 | Angersbach et al. | 318/254 |
| 4,603,283 | 7/1986 | Oltendorf | 318/254 |
| 4,631,459 | 12/1986 | Fujioka et al. | 318/138 X |

FOREIGN PATENT DOCUMENTS

| 56-38988 | 4/1981 | Japan | 318/254 |
| 56-58794 | 5/1981 | Japan | 318/254 |
| 57-43594 | 3/1982 | Japan | 318/254 |
| 59-198891 | 11/1984 | Japan | 318/254 |

Primary Examiner—Bernard Roskoski
Assistant Examiner—Bentsu Ro
Attorney, Agent, or Firm—Antonelli, Terry & Wands

[57] ABSTRACT

A brushless DC motor control system comprises a commercially available semiconductor commutator supplying field current to stator windings of the DC motor, a current detector connected to a negative-side terminal of the semiconductor commutator, a signal conversion circuit converting the output signal of the current detector to a signal correlated to the load of the motor, and a microcomputer controlling the semiconductor commutator according to the output signal of the signal conversion circuit in the motor starting mode.

8 Claims, 8 Drawing Figures

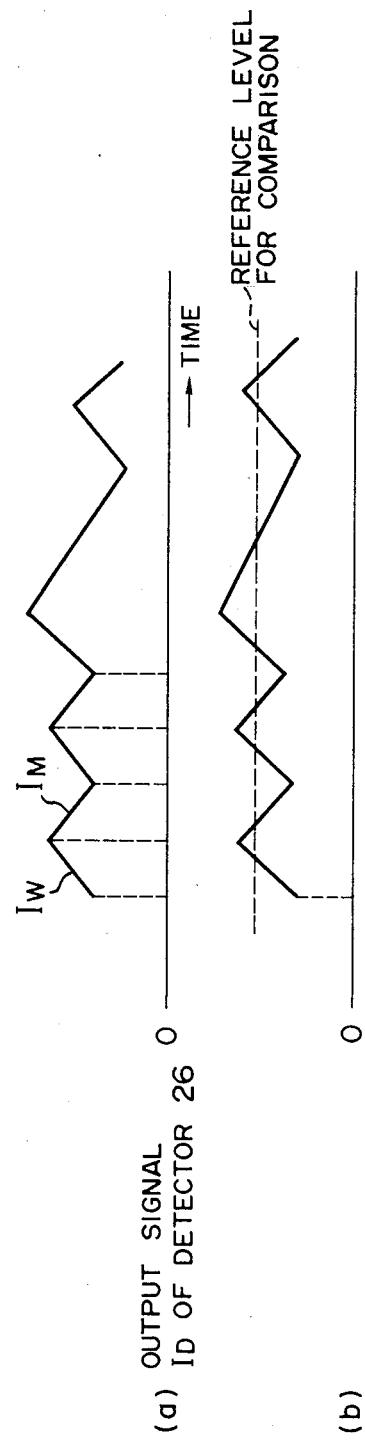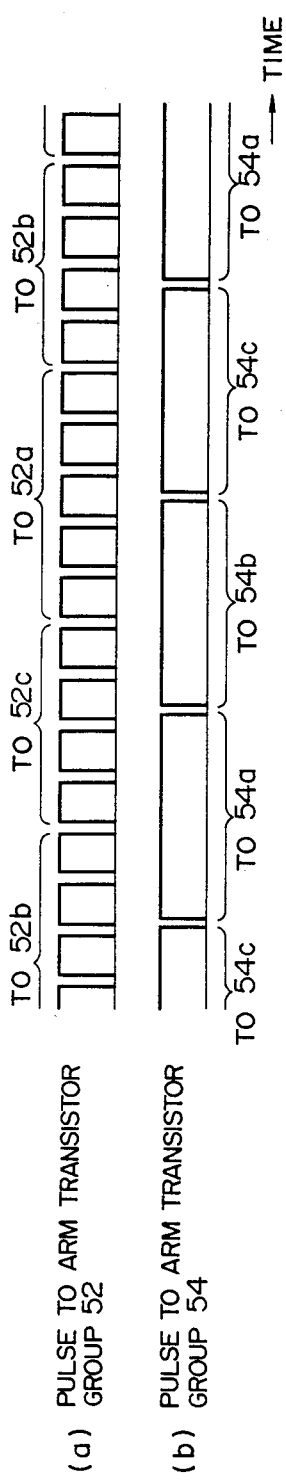

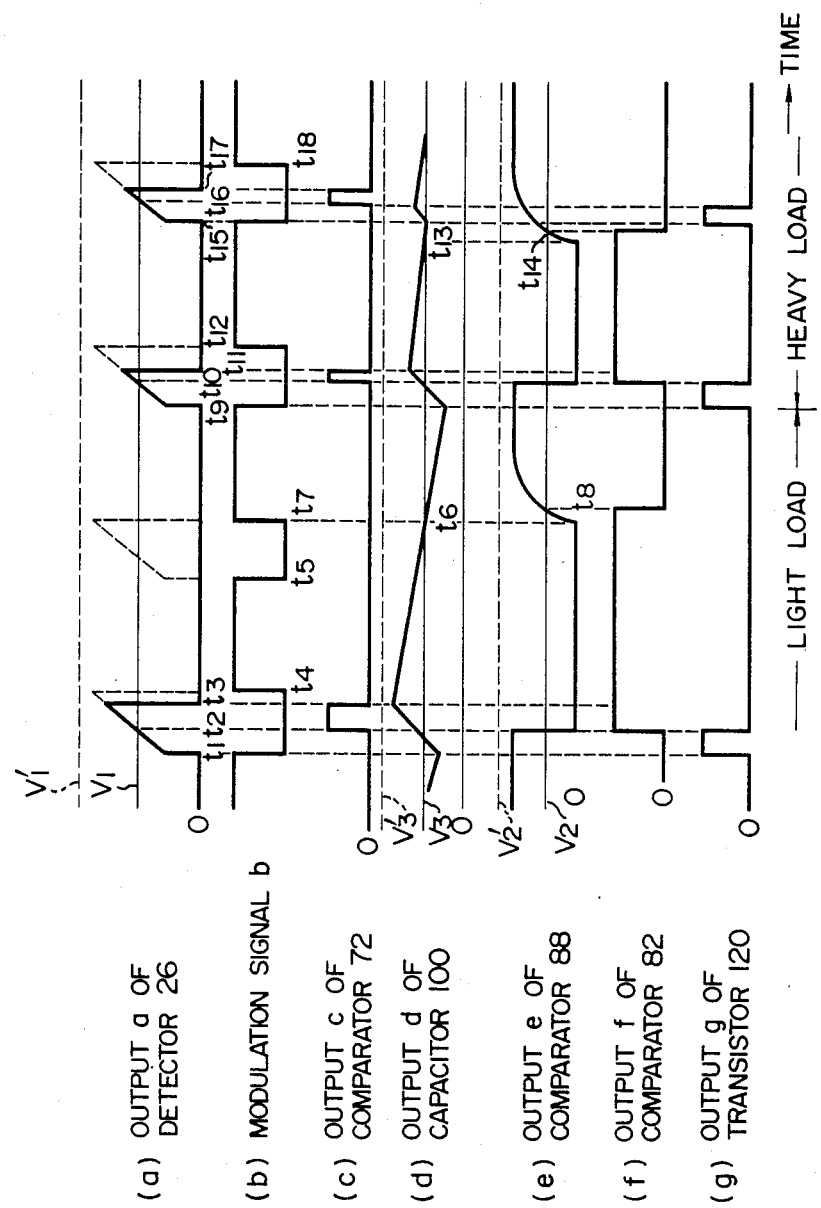

SYSTEM FOR CONTROLLING BRUSHLESS DC MOTOR

BACKGROUND OF THE INVENTION

This invention relates to a system for controlling a brushless DC motor, and more particularly to a control system controlling a semiconductor commutator on the basis of the result of detection of the value of current flowing through the semiconductor commutator supplying exciting current to the DC motor, so that the motor can be smoothly started under whatever loaded condition.

FIG. 1 is a circuit diagram of one form of a prior art control system of the kind described above. Referring to FIG. 1, an AC output of a commercial AC power source 2 is rectified by a rectifier circuit 4. A positive-side arm transistor group 8 is composed of three transistors, and a negative-side arm transistor group 10 is also composed of three transistors. A positive-side arm diode group 12 is composed of three flywheel diodes, and a negative-side arm diode group 14 is also composed of three flywheel diodes. The collectors of the individual transistors constituting the arm transistor group 8 and the cathodes of the individual diodes constituting the arm diode group 12 are common-connected to the positive-side terminal of the rectifier circuit 4. The emitters of the individual transistors constituting the arm transistor group 10 are common-connected to a terminal 16, and the anodes of the diodes constituting the arm diode group 14 are common-connected to another terminal 18 which is connected to the negative-side terminal of the rectifier circuit 4. The arm transistor groups 8, 10 and the arm diode groups 12, 14 constitute a semiconductor commutator.

A brushless DC motor 20 includes three-phase stator windings 22 of, for example, Y-connection and a rotor 24 in the form of a permanent magnet having four poles. The stator windings 22 are connected to the semiconductor commutator 6. A current detector 26 is connected between the terminal 16 of the semiconductor commutator 6 and the negative-side terminal of the rectifier circuit 4 to detect current flowing from the terminal 16 of the semiconductor commutator 6. A control circuit 28 compares the output signal of the current detector 26 indicative of the detected current value with a predetermined reference value and generates a pulse signal representing the on-duty which is dependent upon the result of comparison. On the basis of the pulse signal applied from the control circuit 28, a pulse pattern generator 30 generates and distributes a pulse pattern signal to the bases of the individual transistors constituting the arm transistor groups 8 and 10.

The brushless DC motor 20 is started under control of the control system in a manner as will be described now. First, in response to the output pulse signal from the control circuit 28, the pulse pattern generator 30 applies sequentially a low-frequency commutating pulse signal to the bases of the transistors constituting the arm transistor groups 8 and 10. As a result, every two phases of the stator windings 22 are successively excited to generate a rotating magnetic field, thereby starting rotation of the rotor 24. However, in a low rotation speed range of the brushless DC motor 20, the value of generated torque is large resulting in unstable starting, because such a motor has a starting characteristic as shown in FIG. 2. To avoid such unstable starting, it is necessary to limit the exciting current supplied to the stator windings 22 in the starting stage.

Current $I_W$ supplied from the semiconductor commutator 6 to the stator windings 22 flows from the arm transistor group 8 to the current detector 26 through the stator windings 22, arm transistor group 10 and terminal 16 and flows then to the negative-side terminal of the rectifier circuit 4.

The individual transistors constituting the arm transistor group 8 are repeatedly intermittently turned on-off at a frequency higher than the frequency of rotation of the rotor 24. Therefore, when any one of the transistors in the arm transistor group 8 is in its on-state, the current $I_W$ is supplied to the stator windings 22. On the other hand, when all of the transistors in the arm transistor group 8 are in their off-state, self-induction occurring in the stator windings 22 produces current $I_M$ which flows from the stator windings 22 and returns to the stator windings 22 through the arm transistor group 10, terminal 16, current detector 26, and terminal 18.

Therefore, current $I_D$ which is the sum of the currents $I_W$ and $I_M$, as shown in (a) of FIG. 3, flows through the current detector 26. The value of this current $I_D$ is correlated to the load of the DC motor 20, and the heavier the load, the value of this current $I_D$ is larger. Therefore, it is preferable to control the pulse pattern generator 30 by detecting the value of the current $I_D$, shown in (a) of FIG. 3, by the current detector 26, comparing the detected current value with the predetermined reference value, shown in (b) of FIG. 3, in a comparator which may be incorporated in the control circuit 28, applying the resultant output of the comparator to a microcomputer which may be incorporated in the control circuit 28 and applying a corresponding control signal from the microcomputer to the pulse pattern generator 30, so as to control the on-duty and the operating frequency of the transistors in the arm transistor group 8. That is, the preferred manner of control is such that the higher the output of the comparator, the on-duty and/or the operating frequency of the transistors in the arm transistor group 8 are decreased, so that the semiconductor commutator 6 can supply an appropriate output current to the stator windings 22 in the starting stage, thereby preventing generation of unnecessarily large torque to ensure smooth starting of the DC motor 20. However, in order to detect the current $I_D$ correlated to the load of the DC motor 20, the semiconductor commutator 6 of special type as shown in FIG. 1 must be used. It will be seen in FIG. 1 that the terminal 18, to which the anodes of the diodes constituting the arm diode group 14 are common-connected, is provided separately from the terminal 16 to which the emitters of the transistors constituting the arm transistor group 10 are common-connected. Such a semiconductor commutator differs in structure from those mass-produced and easily commercially available in the market. Therefore, such a special semiconductor commutator must be manufactured separately from commercially available ones, resulting in a higher system cost.

SUMMARY OF THE INVENTION

It is a primary object of the present invention to provide a control system for a brushless DC motor, in which a commercially available semiconductor commutator is employed to attain stable starting of the DC motor.

The present invention which attains the above object is featured in that output current of a commercially available semiconductor commutator supplying a brushless DC motor is detected by a current detector, a signal conversion circuit produces, on the basis of the detected current, a pseudo signal analogous to the current signal correlated to the load of the DC motor, and the output of the semiconductor commutator is controlled according to the pseudo signal in the starting stage of the motor.

BRIEF DESCRIPTION OF THE DRAWINGS

FIG. 3 shows the waveform of the output signal of the current detector shown in FIG. 1, together with a reference level used for comparison.

FIG. 6 shows signal waveforms appearing at various parts of the signal conversion circuit shown in FIG. 5.

FIG. 7 is a time chart showing the output signals of the pulse pattern generator shown in FIG. 4.

DESCRIPTION OF THE PREFERRED EMBODIMENT

Figure 1:
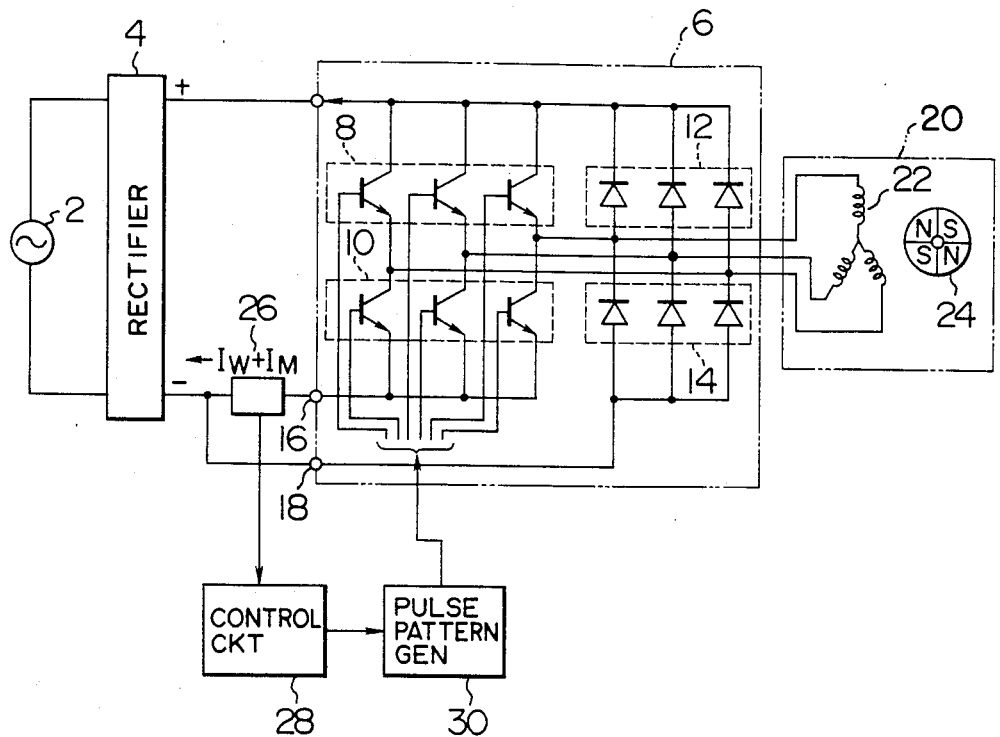
FIG. 1 is a circuit diagram of a prior art control system for a brushless DC motor.
Figure 2:
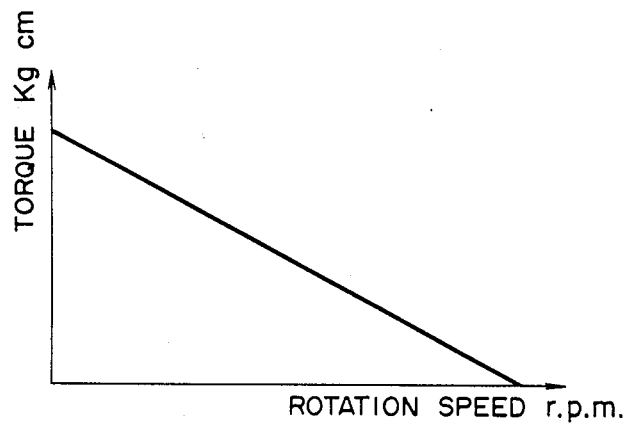
FIG. 2 shows the starting characteristic of a DC motor.
Figure 4:
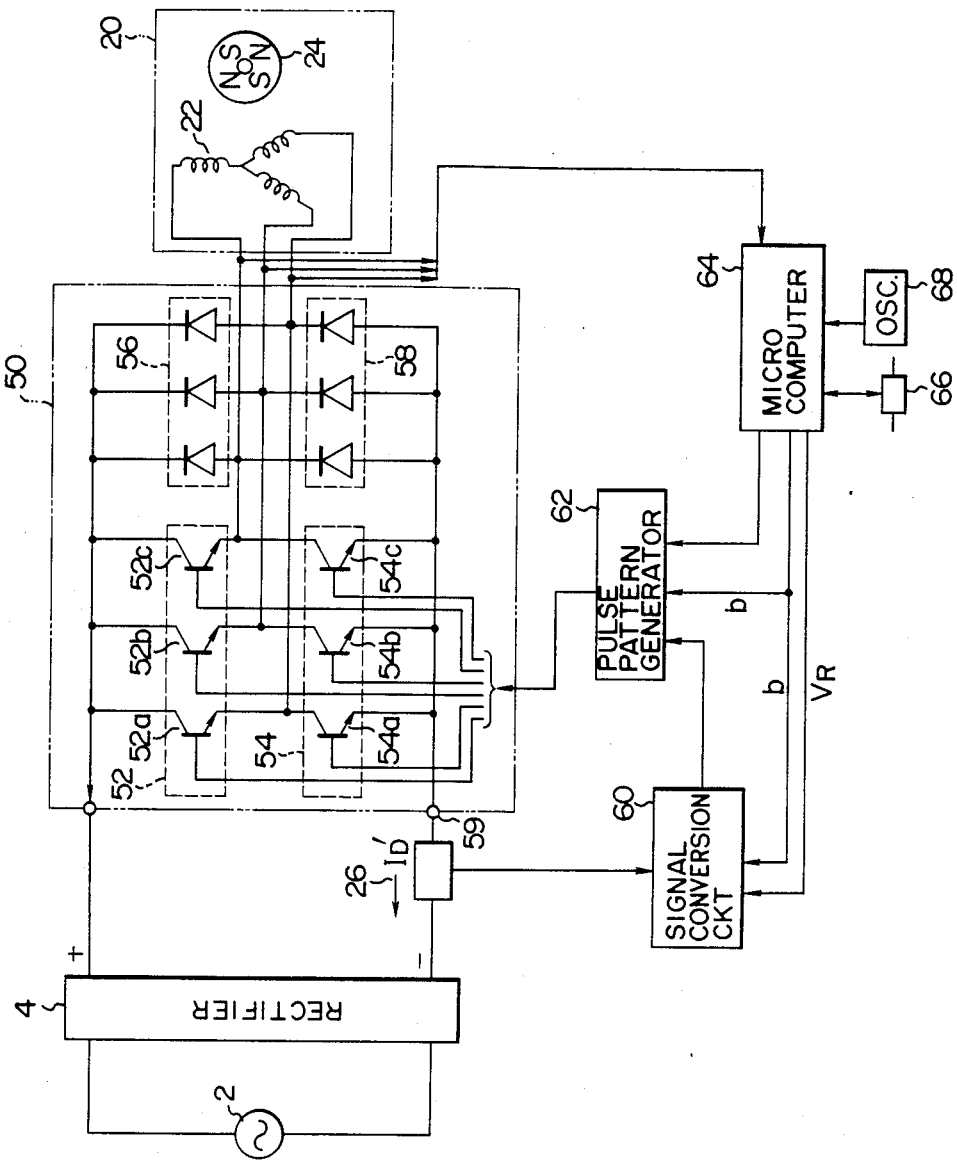
FIG. 4 is a circuit diagram of an embodiment of the control system controlling a brushless DC motor according to the present invention.

FIG. 4 is a circuit diagram of a typical embodiment of the control system controlling a brushless DC motor according to the present invention. In FIG. 4, like reference numerals are used to designate like functional parts appearing in FIG. 1.

Referring to FIG. 4, a commercially available semiconductor commutator 50 includes arm transistor groups 52, 54 and arm diode groups 56, 58. The collectors of transistors 52a, 52b and 52c constituting the arm transistor group 52 and the cathodes of diodes constituting the arm diode group 56 are common-connected to the positive-side terminal of a rectifier circuit 4. The emitters of transistors 54a, 54b and 54c constituting the arm transistor group 54 and the anodes of diodes constituting the arm diode group 58 are common-connected to a terminal 59.

The terminal 59 is connected through a current detector 26 to the negative-side terminal of the rectifier circuit 4. The output signal of the current detector 26 indicative of the detected current value is applied to a signal conversion circuit 60 to be converted to a signal analogous to the current signal $I_D$ shown in (a) of FIG. 3, and a pulse signal, as shown in (g) of FIG. 6, having a frequency dependent upon the load of a brushless DC motor 20 is generated from the signal conversion circuit 60. The output pulse signal from the signal conversion circuit 60 and an output pulse signal, as shown in (b) of FIG. 6, from a microcomputer 64 are applied to a pulse pattern generator 62. On the basis of the pulse signal applied from the signal conversion circuit 60 or from the microcomputer 64, the pulse pattern generator 62 generates a pulse pattern signal to the bases of the individual transistors of the arm transistor groups 52 and 54 in the semiconductor commutator 50 to control the output current of the semiconductor commutator 50.

Terminal voltages of the individual phases of the stator windings 22 of the DC motor 20 are applied to the microcomputer 64, and the microcomputer 64 computes the frequency of the rotating magnetic field produced by the stator windings 22, that is, the rotation speed of the DC motor 20. Applied also to the microcomputer 64 are an output signal of an oscillator 68 and an output signal of a motor speed commanding unit 66 commanding the rotation speed of the DC motor 20 in its steady operation mode after the DC motor 20 has been started.

When the computed rotation speed of the DC motor 20 is lower than a predetermined speed, the microcomputer 64 determines that the DC motor 20 is in its starting operation mode, and the output pulse signal from the signal conversion circuit 60 is applied to the pulse pattern generator 62 to control the semiconductor commutator 50. On the other hand, when the computed rotation speed of the DC motor 20 is higher than the predetermined speed, the microcomputer 64 determines that the starting operation mode has ended, and the output pulse signal from the microcomputer 64 is applied to the pulse pattern generator 62 to control the semiconductor commutator 50.

The operation of the DC motor control system shown in FIG. 4 will now be described.

The semiconductor commutator 50 employed in the present invention is a commercially available one as described above. Therefore, current $I_W$ supplied from the semiconductor commutator 50 to the stator windings 22 flows from the arm transistor group 52 to the negative-side terminal of the rectifier circuit 4 through the stator windings 22, arm transistor group 54, terminal 59 and current detector 26. When all of the transistors in the arm transistor group 52 are in their off-state, current $I_M$ induced by self-induction flows from the stator windings 22 to return to the stator windings 22 through the arm transistor group 54 and arm diode group 58. In this case, current $I_D'$ flowing through the current detector 26 is the current $I_W$ only. In the present invention, therefore, the current $I_W$ is converted by the signal conversion circuit 60 to a signal analogous to the current $I_D = I_W + I_M$ shown in (a) of FIG. 3, so that this pseudo signal can provide the current signal correlated to the load of the DC motor 20. Then, on the basis of such a pseudo signal, the signal conversion circuit 60 generates a pulse signal for turning on the transistors of the transistor groups of the semiconductor commutator 50 and applies the pulse signal to the pulse pattern generator 62.

Figure 5:
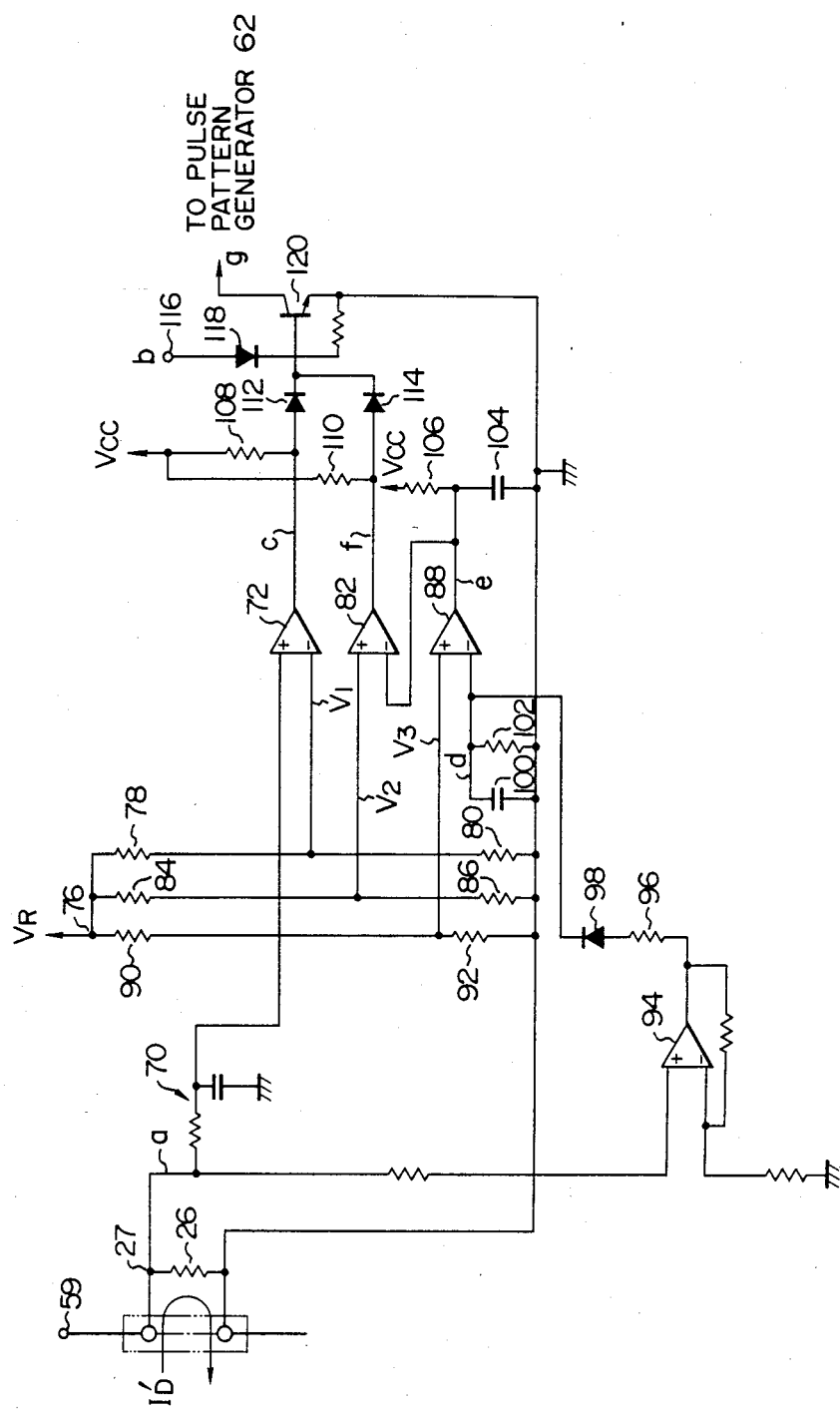
FIG. 5 is a circuit diagram of one form of the signal conversion circuit shown in FIG. 4.

FIG. 5 is a circuit diagram of the signal conversion circuit 60, and FIG. 6 is a time chart showing signal waveforms appearing at various parts of the circuit shown in FIG. 5.

Referring to FIG. 5, the current detector 26 is, for example, a resistor connected in series between the terminal 59 and the negative-side terminal of the rectifier circuit 4. Therefore, the voltage appearing across the terminals 27 of the resistor 26 is proportional to the value of the current $I_D' = I_W$ and has a waveform as shown in (a) of FIG. 6. The output signal of the current detector 26 is applied to the plus input terminal of a first comparator 72 through a noise-removing low-pass filter 70 constituted by a resistor and a capacitor. The microcomputer 64 applies a predetermined reference voltage $V_R$ to a terminal 76, and, since the terminal 76 is connected through a resistor 78 to the minus input terminal of the first comparator 72, a reference voltage $V_1$ is applied to the minus input terminal of the comparator 72 through the resistor 78. Similarly, another reference voltage V₂ is applied through a resistor 84 to the plus input terminal of a second comparator 82, and another reference voltage V₃ is applied through a resistor 90 to the plus input terminal of a third comparator 88.

Therefore, an output of high level as shown in (c) of FIG. 6 appears from the first comparator 72 when the output voltage of the current detector 26 exceeds the reference voltage $V_1$. The output signal of the current detector 26 is also applied to a capacitor 100 through an amplifier 94, a resistor 96, a diode 98 and a resistor 102. Therefore, during the period (from time $t_1$ to time $t_3$) in which the output signal of the current detector 26 is present as shown in (a) of FIG. 6, the capacitor 100 is charged, and its output voltage increases as shown in (d) of FIG. 6. On the other hand, in the period (from time $t_3$ to time $t_8$) where there is no output signal from the current detector 26, the capacitor 100 discharges, and its output voltage decreases. By suitably adjusting the capacitance of the capacitor 100 and the resistances of the resistors 96 and 102, the waveform of the output voltage of the capacitor 100 is approximated or made analogous to that of the current signal shown in (a) of FIG. 3.

An output of low level appears from the third comparator 88 when the output voltage of the capacitor 100 becomes higher than the reference voltage $V_3$, and an output of high level appears from the comparator 88 when the output voltage of the capacitor 100 becomes lower than the reference voltage $V_3$. Therefore, the output of the third comparator 88 is in its low level from time $t_2$ to time $t_7$ as shown in (e) of FIG. 6. The output of the third comparator 88 is applied to the minus input terminal of the second comparator 82 to be compared with the reference voltage $V_2$. Therefore, the output of the second comparator 82 is in its high level from time $t_2$ to time $t_7$ as shown in (f) of FIG. 6.

The output signals c and f of the respective comparators 72 and 82 are applied to a NOR logic circuit constituted by diodes 112, 114, 118 and a transistor 120. A modulation signal b as shown in (b) of FIG. 6 is applied from the microcomputer 64 to the anode of the diode 118 of the NOR logic circuit through a terminal 116. A DC power supply voltage Vcc is applied to the anodes of the diodes 112 and 114 through resistors 108 and 110 respectively.

The output signal of the NOR logic circuit, that is, the collector signal g of the transistor 120 has a waveform as shown in (g) of FIG. 6, and its logical expression relative to the input signals b, c and f is as follows:

$$g = \overline{b} \cdot \overline{c} \cdot \overline{f}$$

Thus, the output signal g of the NOR logic circuit is in its high level only when all of the input signals b, c and f are in their low level. The collector signal g of the transistor 120 is applied to the pulse pattern generator 62 as the output signal of the signal conversion circuit 60.

The pulse pattern generator 62 has a structure well known in the art. On the basis of the input signal g and modulation signal b, the pulse pattern generator 62 produces pulse signals and applies such pulse signals to the bases of the transistors 52a, 52b, 52c and 54a, 54b, 54c in the respective arm transistor groups 52 and 54, as shown in a time chart of FIG. 7. FIG. 7 shows, in (a), the pulse signal produced on the basis of the signals b and g and applied sequentially to the bases of the transistors 52a, 52b and 52c of the arm transistor group 52. This pulse signal is synchronous with the modulation signal b, and its pulse width is modulated by the signal g. FIG. 7 shows, in (b), the pulse signal applied sequentially to the bases of the transistors 54a, 54b and 54c of the arm transistor group 54.

The lighter the load of the DC motor 20, the peak value of the output signal a of the current detector 26 shown in (a) of FIG. 6 is larger, and the heavier the load, the peak value is smaller. The output signal a of the current detector 26 has a large peak value in the period of from time $t_1$ to time $t_3$ as shown in (a) of FIG. 6. Consequently, the voltage charged in the capacitor 100 is correspondingly high as shown in (d) of FIG. 6. Therefore, a considerable length of time is required until the charged voltage of the capacitor 100, which starts to discharge from time $t_3$, drops to the level of the reference voltage $V_3$. Accordingly, in the second low-level period (from time $t_5$ to time $t_7$) of the modulation signal b after the first low-level period (from time $t_1$ to time $t_4$) in which the transistor 120 is turned on, the output signal f of the second comparator 82 is not in its low level, and no output signal g appears from the transistor 120 in that period. Consequently, the output signal a of the current detector 26, shown by the dotted lines in (a) of FIG. 6, is not detected in the period of from time $t_5$ to time $t_7$.

On the other hand, the output signal a of the current detector 26 has a small peak value in the period of from time $t_9$ to time $t_{11}$ as shown in (a) of FIG. 6. Consequently, the voltage charged in the capacitor 100 is correspondingly low as shown in (d) of FIG. 6. Therefore, when the capacitor 100 discharges from time $t_{11}$, its terminal voltage drops to the level of the reference voltage $V_3$ in a short length of time. As a result, the output signal f of the second comparator 82 is in its low level in the low-level period (from time $t_{15}$ to time $t_{18}$) of the modulation signal b, and the signal g appears from the transistor 120. Therefore, the output signal a of the current detector 26, shown by the solid lines in (a) of FIG. 6, is detected in the period of from time $t_{15}$ to time $t_{18}$.

Thus, when the load of the DC motor 20 is light, a large charge current is supplied to the capacitor 100, and the current $I_W$ flows through the current detector 26, hence, the stator windings 22 during the period of from time $t_5$ to time $t_7$. Therefore, excessively large torque is not developed in the DC motor 20, and there is no possibility of occurrence of step-out in which the rotor rotates at a rate faster than the rate of change of the current phase.

Also, when the load of the DC motor 20 is heavy, a small charge current is supplied to the capacitor 100, and the current $I_W$ flows through the current detector 26 in each low-level period of the modulation signal b. Therefore, the DC motor 20 develops large torque without the possibility of failure of starting.

Figure 8:
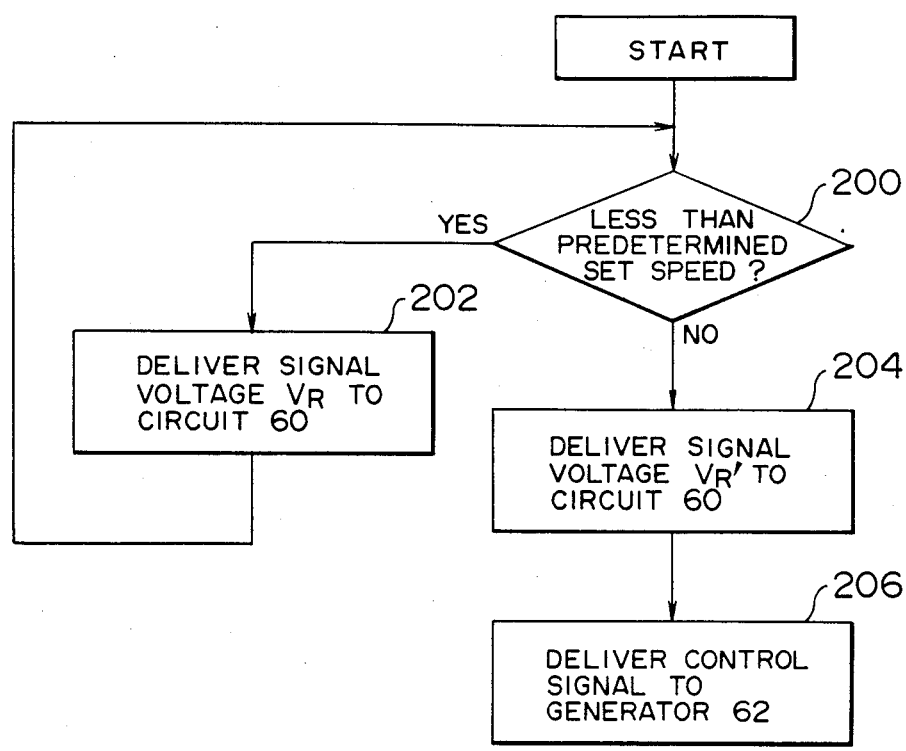
FIG. 8 is a flow chart showing the operation of a microcomputer.

The operation of the control system of FIG. 4 will be explained referring to FIG. 8.

In response to turn on of a power source of the control system, in step 200, the microcomputer 64 calculates the motor speed on the basis of the terminal voltages of the three phases of the stator windings 20 and determines whether the motor speed is less than the predetermined set speed or not. In this case, the motor is not driven yet, it is determined that the motor speed is less than the set speed, so that the process proceeds to step 202. In step 202, the microcomputer delivers the signal voltage $V_R$ to the signal conversion circuit 60 to start the motor.

After the DC motor 20 has been started, its rotation speed increases progressively. When the motor rotation speed computed by the microcomputer 64 on the basis of the terminal voltages of the respective phases of the stator windings 22 attains a predetermined setting, it is determined "Yes" in step 200 and then the microcomputer 64 decides that the starting operation mode has ended. Then, in step 204, the microcomputer changes the level of the signal voltage $V_R$ having been applied to the signal conversion circuit 60 to a higher level $V_R'$. As a result, the levels of the reference voltages $V_1$, $V_2$ and $V_3$ having been applied to the comparators 72, 82 and 88 are raised to higher levels $V_1'$, $V_2'$ and $V_3'$ as shown in (a), (d) and (e) of FIG. 6 respectively. The transistor 120 is not turned on, and its output signal g disappears. Then, in step 206, the microcomputer 64 applies a control signal to the pulse pattern generator 62 so that the rotation speed of the DC motor 20 can be increased to the setting commanded by the speed commanding unit 66.

It will be understood from the foregoing detailed description of the present invention that, in the starting stage of the DC motor 20, the current signal detected by the current detector 26 is suitably transformed to produce a signal waveform correlated to the load of the motor, and the rotation speed of the motor is controlled on the basis of that signal waveform, while, after the starting operation mode has ended, the rotation speed of the motor is controlled under control of the microcomputer 64.

According to the present invention, a semiconductor commutator commercially available in the market is used to achieve stable starting of the motor. Therefore, the cost of the system can be reduced, and the structure of the system can be simplified.

We claim:

1. A brushless DC motor control system comprising:
   a brushless DC motor including a permanent magnet rotor and stator windings;
   a semiconductor commutator including a plurality of switching elements supplying a field current to said stator windings;
   a rectifier circuit rectifying an output current of an AC power source to supply the rectified current to said semiconductor commutator;
   current detecting means connected between a negative-side terminal of said semiconductor commutator and a negative-side terminal of said rectifier circuit;
   signal converting means for converting an output signal of said current detecting means to a signal correlated to the load of said motor;
   first control means for controlling on-off of said switching elements of said semiconductor commutator according to the output signal of said signal converting means; and
   second control means for controlling said signal converting means so that the output signal of said signal converting means is applied to said first control means when said motor is to be started.

2. A system as claimed in claim 1, wherein said second control means includes means for detecting the rotation speed of said motor and means for inhibiting application of the output signal of said signal converting means to said first control means when said speed detecting means detects that the rotation speed of said motor has attained a predetermined setting.

3. A system as claimed in claim 1, wherein said signal converting means includes a charge-discharge circuit receiving the output signal of said current detecting means as an input thereof, and the output signal of said charge-discharge circuit is applied to said first control means as the signal correlated to the load of said motor.

4. A system as claimed in claim 2, wherein said second control means controls said semiconductor commutator on the basis of the output signal of said signal converting means until the rotation speed of said motor attains the predetermined setting, but on the basis of an output signal of said second control means after the rotation speed of said motor has exceeded the predetermined setting.

5. A brushless DC motor control system comprising:
   a brushless DC motor including a permanent magnet rotor and stator windings;
   a semiconductor commutator including a plurality of switching elements supplying a field current to said stator windings;
   a rectifier circuit rectifying an output current of an AC power source to supply the rectified current to said semiconductor commutator;
   current detecting means connected between a negative-side terminal of said semiconductor commutator and a negative-side terminal of said rectifier circuit;
   signal converting means for converting an output signal of said current detecting means to a signal correlated to the load of said motor;
   first control means for controlling on-off of said switching elements of said semiconductor commutator according to the output signal of said signal converting means independently of any detection of rotating position of said motor; and
   second control means for controlling said signal converting means so that the output signal of said signal converting means is applied to said first control means when said motor is to be started.

6. A system as claimed in claim 5, wherein said second control means includes means for detecting the rotation speed of said motor and means for inhibiting application of the output signal of said signal converting means to said first control means when said speed detecting means detects that the rotation speed of said motor has attained a predetermined setting.

7. A system as claimed in claim 5, wherein said signal converting means includes a charge-discharge circuit receiving the output signal of said current detecting means as an input thereof, and the output signal of said charge-discharge circuit is applied to said first control means as the signal correlated to the load of said motor.

8. A system as claimed in claim 6, wherein said second control means controls said semiconductor commutator on the basis of the output signal of said signal converting means until the rotation speed of said motor attains the predetermined setting, but on the basis of an output signal of said second control means after the rotation speed of said motor has exceeded the predetermined setting.

* * * * *